US012756772B2

(12) United States Patent
Huang

(10) Patent No.: US 12,756,772 B2
(45) Date of Patent: Oct. 6, 2026

(54) COMPUTING POWER APPLICATION TRAFFIC FORWARDING METHOD AND APPARATUS

(71) Applicant: ZTE Corporation, Shenzhen (CN)

(72) Inventor: Guangping Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 701 days.

(21) Appl. No.: 18/039,759

(22) PCT Filed: Aug. 11, 2021

(86) PCT No.: PCT/CN2021/112131

§ 371 (c)(1),
(2) Date: Jun. 1, 2023

(87) PCT Pub. No.: WO2022/121349

PCT Pub. Date: Jun. 16, 2022

(65) Prior Publication Data

US 2024/0022650 A1 Jan. 18, 2024

(30) Foreign Application Priority Data

Dec. 7, 2020 (CN) ......................... 202011420427.9

(51) Int. Cl.
*H04L 69/22* (2022.01)

(52) U.S. Cl.
CPC .................................... *H04L 69/22* (2013.01)

(58) Field of Classification Search
CPC ..... G06F 9/4881; G06F 9/5027; H04L 45/00; H04L 45/34; H04L 61/5069;
(Continued)

(56) References Cited

U.S. PATENT DOCUMENTS 10,736,029 B1 * 8/2020 Young ................. H04L 12/4633
2019/0140863 A1 * 5/2019 Nainar .................... H04L 45/34
(Continued)

FOREIGN PATENT DOCUMENTS

CN 110532092 A 12/2019
CN 111865658 A 10/2020
(Continued)

OTHER PUBLICATIONS

European Search Report for corresponding application EP21902059; Report dated May 28, 2024.
(Continued)

*Primary Examiner* — Thomas R Cairns
*Assistant Examiner* — Kai Chang
(74) *Attorney, Agent, or Firm* — CANTOR COLBURN LLP

(57) ABSTRACT

Provided is a method and apparatus for forwarding computing-power application traffic. The method includes: when computing-power application traffic reaches an SRv6 node, the SRv6 node parses a computing-power service from a NSH or an IPv6 SRH of the computing-power application traffic, wherein the computing-power service is encapsulated in the NSH as a service function, or is directly encapsulated in the IPv6 SRH; if the computing-power service belongs to the SRv6 node, the SRv6 node selects a corresponding instance node according to a mapping relationship between the computing-power service and a plurality of instance nodes; and the SRv6 node forwards the computing-power application traffic to the selected instance node.

18 Claims, 5 Drawing Sheets

(58) Field of Classification Search
CPC ..... H04L 67/1004; H04L 67/63; H04L 69/22; H04L 2101/604; H04L 2101/659; H04L 2101/668; Y02D 30/70
See application file for complete search history.

(56) References Cited

U.S. PATENT DOCUMENTS

| | | | | |
|---|---|---|---|---|
| 2020/0099610 | A1 | 3/2020 | Heron et al. | |
| 2020/0244722 | A1 | 7/2020 | Jeuk | |
| 2020/0287826 | A1* | 9/2020 | Wang | H04L 12/4679 |
| 2020/0322262 | A1 | 10/2020 | Maino et al. | |
| 2020/0389397 | A1* | 12/2020 | Stammers | H04L 12/4625 |
| 2021/0409318 | A1* | 12/2021 | Zhang | H04L 67/63 |
| 2022/0109627 | A1* | 4/2022 | Li | H04L 69/22 |
| 2022/0109745 | A1* | 4/2022 | Zhang | H04L 69/22 |
| 2023/0030344 | A1* | 2/2023 | Chen | H04L 45/34 |
| 2023/0327995 | A1* | 10/2023 | Du | H04L 45/24 370/392 |

FOREIGN PATENT DOCUMENTS

| | | | |
|---|---|---|---|
| CN | 111866775 | A | 10/2020 |
| CN | 111988395 | A | 11/2020 |
| CN | 112751826 | A | 5/2021 |
| JP | 2017038179 | A | 2/2017 |
| JP | 2017208735 | A | 11/2017 |
| WO | 2017137004 | A1 | 8/2017 |

OTHER PUBLICATIONS

Guichard J, "Intergration of Network Service header NSH and Segment Routing for Service Function Chaining", Sep. 25, 2020, pp. 1-17, XP015141841.
Guichard J, "NSH and Segment Routing for Service Function Chaining", April 6, 20218, pp. 1-15, XP015125855.
International Search Report for corresponding application PCT/CN2021/112131 filed Aug. 11, 2021; Mail date Sep. 30, 2021.
Interop Tokyo 2019 ShowNet "Practical Knowledge of SRv6 Seen through Service Chaining Construction" Nippon, 2019, [Date of obtainment: Jun. 9, 2025], Obtained from < https://www.onic.jp/archives/2019/slide/ShowNet2019_ONIC.pdf >; 41 pages.
Japanese Office Action; Application No. 2023534687; date of mailing: Jun. 9, 2025; 13 pages.

* cited by examiner

COMPUTING POWER APPLICATION TRAFFIC FORWARDING METHOD AND APPARATUS

CROSS-REFERENCE TO RELATED APPLICATION

This disclosure is based upon and claims the priority of the Chinese Patent Application No. CN202011420427.9, filed on 7 Dec. 2020, the content of which is incorporated herein by reference in its entirety.

TECHNICAL FIELD

Embodiments of the present disclosure relate to the field of communications, and in particular, to a computing-power application traffic forwarding method and apparatus.

BACKGROUND

With the rapid development of high-bandwidth and low-latency services such as video, game, and vehicle networking, and the higher and higher proportion of service traffic, computing-power resources and storage resources begin to evolve from traditional centralized deployment to distributed deployment. Computing-power resources of a terminal, an edge node and a cloud node are connected via a network, and service traffic is scheduled together with the network, i.e. the service traffic is routed to a currently optimal computing node for processing, which has been more and more popular in industry. The service traffic is routed to a corresponding computing-power node for processing according to different service requirements, and will be a mainstream service scenario and service requirements of the computing-power network.

A computing-power network requires a network to make a routing decision on service traffic according to computing-power distribution resources, i.e. to route a service to a currently optimal computing node for processing, so that the pooling advantages of distributed computing-power resources are achieved, the utilization rate of computing-power resources is improved, and the computing-power and network requirements of the service are satisfied more precisely at the same time.

Compared with the current network, especially the layer 2 and the layer 3 network, granularity of forwarding processing is a packet or a type stream, and corresponding bandwidth, queue and cache resources are configured for the packet or the type stream. Node computing-power resources in the computing-power network are used instead of messages and streams, which results in that the current network messages and stream processing mechanisms are no longer suitable for the computing-power network.

SUMMARY

Embodiments of the present disclosure provide a computing-power application traffic forwarding method and apparatus, so as to at least solve the problem in the related art that a current network packet and a stream processing mechanism are no longer suitable for a computing-power network.

In a computing-power network, the network needs to directly match a specific application or service with a computing node optimally matching the application or service, and perform corresponding service traffic routing, which requires that collaborative optimization routing is performed on an application flow according to a network and a computing-power resource, and a routing decision process needs application information to directly participate. In practical deployments, it is impossible for the network to identify all the upper layer applications, and therefore it is necessary to decompose the applications into a combination of some basic atomic functions, such as Fourier transform, matrix operation, encoding and decoding algorithms, and the network layer performs optimal computing-power matching on these atomic functions and performs corresponding routing decisions.

A computing-power network needs to execute two core functions on the basis of current network architecture. First, computing-power perception is performed. A serviceable computing-power granularity may be a basic computing-power such as a CPU and a GPU, and may also be a basic atomic computing-power function example, and may also be a general computing-power service instance with a larger granularity. Regardless of which granularity, a network is a computing-power service. The second one is to accurately route the applications and service flows to the optimal computing-power service node for processing according to the computing-power demand of the upper layer application in combination with the perception of the current computing-power resource state of the whole network.

According to an embodiment of the present disclosure, a method for forwarding computing-power application traffic is provided, comprising: when the computing-power application traffic reaches a Segment Routing over IPv6 (SRv6) node, the SRv6 node parses a computing-power service from a network service header (NSH) of the computing-power application traffic, wherein the computing-power service is encapsulated in the NSH as a service function (SF); if the computing-power service belongs to the SRv6 node, the SRv6 node selects a corresponding instance node according to a mapping relationship between the computing-power service and a plurality of instance nodes; the SRv6 node forwards the computing-power application traffic to the selected instance node.

In an exemplary embodiment, after the SRv6 node parses the computing-power service from the NSH of the computing-power application traffic, the method further includes: if the current computing-power service belongs to other SRv6 nodes, the SRv6 node routes the computing-power application traffic to a next hop according to transmission tunnel path information in a segment routing header (SRH).

In an exemplary embodiment, when the computing-power application traffic reaches an SRv6 node, before the SRv6 node parses the current computing-power service from the NSH of the computing-power application traffic, the method further includes: the SRv6 routing node performing a computing-power service registration for a local computing-power service node, and creating a mapping relationship between the computing-power service and a plurality of instance nodes.

In an exemplary embodiment, the SRv6 routing node performs a computing-power service registration for a local computing-power service node, and creates a mapping relationship between the computing-power service and a plurality of instance nodes, comprising: the SRv6 node receives a computing-power service registration request of the local computing-power service node and resource state information of the instance nodes; the SRv6 node notifies the locally registered power resource state information to the neighbor node, and creates a global computing-power resource state database; or report computing-power resource state database to a centralized controller through a northbound interface, so that the centralized controller creates the global computing-power resource state database; the SRv6 node establishes a mapping relationship between the computing-power service and a plurality of instance nodes.

In an exemplary embodiment, the step that the SRv6 node selects the corresponding instance node according to the mapping relationship between the computing-power service and the plurality of instances includes that the SRv6 node selects the corresponding instance node from the plurality of instance nodes according to a local configuration policies of at least one of the following: shortest path, load balance, path delay.

According to another embodiment of the present disclosure, a method for forwarding computing-power application traffic is provided. The method includes: when the computing-power application traffic reaches an SRv6 node, the SRv6 node parsing a computing-power service from a segment routing header (SRH) of the computing-power application traffic, wherein the computing-power service is encapsulated in the SRH as a hop in an SRv6 segment list; if the next hop indicated by the SRH is a computing-power service, the SRv6 node selects a corresponding instance node according to a mapping relationship between the computing-power service and a plurality of instance nodes; the SRv6 node forwards the computing-power application traffic to the selected instance node.

In an exemplary embodiment, after the SRv6 node obtains the computing-power service from the section routing header SRH of the computing-power application traffic, the method further includes: if the next hop indicated by the SRH is another SRv6 node, the SRv6 node routes the computing-power application traffic to the next hop.

In an exemplary embodiment, when the computing-power application traffic reaches the SRv6 node, before the SRv6 node parses the computing-power service from the segment routing header (SRH) of the computing-power application traffic, the method further includes: the SRv6 routing node performing a computing-power service registration for a local computing-power service node, and creating a mapping relationship between the computing-power service and a plurality of instance nodes.

In an exemplary embodiment, the SRv6 routing node performs a computing-power service registration for a local computing-power service node, and creates a mapping relationship between the computing-power service and a plurality of instance nodes, comprising: the SRv6 node receives a computing-power service registration request of the local computing-power service node and resource state information of the instance nodes; the SRv6 node notifies the locally registered power resource state information to the neighbor node, and creates a global computing-power resource state database; or report computing-power resource state database to a centralized controller through a northbound interface, so that the centralized controller creates the global computing-power resource state database; the SRv6 node establishes a mapping relationship between the computing-power service and a plurality of instance nodes.

In an exemplary embodiment, the step that the SRv6 node selects the corresponding instance node according to the mapping relationship between the computing-power service and the plurality of instances includes that the SRv6 node selects the corresponding instance node from the plurality of instance nodes according to a local configuration policies of at least one of the following: shortest path, load balancing, path latency.

In an exemplary embodiment, the mapping relationship between the computing-power service and the plurality of instance nodes includes one of the following modes: defining an Anycast segment routing (SR) identifier, wherein the Anycast address identifies the computing-power service, and a plurality of member addresses associated with the computing-power service identify the plurality of instance nodes of the computing-power service; defining a CID (Computing Segment identification), wherein the CID is associated with a dynamic instance node member group, and each instance node corresponds to a unique reachable address.

In an exemplary embodiment, the method further includes: if the instance node does not support SRv6 forwarding, performing SRH encapsulation and decapsulation on the computing-power application traffic through an SRv6 proxy between the instance node and the SRv6 node, and brokering the instance node to complete the forwarding of the computing-power application traffic.

In an exemplary embodiment, before the computing-power application traffic reaches the SRv6 node, the method further includes: when the computing-power application traffic reaches the SRv6 ingress node, the SRv6 ingress node selects, according to the global computing-power resource state database, an instance node of each computing-power service, and programs an atomic computing-power service function.

In an exemplary embodiment, programming the atomic computing-power service function includes: marking an atomic computing-power service function identifier by means of a combination of Locator+Function+Argument, wherein Locator is a public address prefix of a computing-power service instance node, Function is a globally unique identifier of an atomic computing-power service function, and Argument is an optional parameter of Function.

According to another embodiment of the present disclosure, provided is a power application traffic forwarding apparatus, comprising: a first parsing module, configured to, when power application traffic reaches an SRv6 node, parse a power service from a network service header (NSH) of the computing-power application traffic, wherein the power service is encapsulated in the NSH as a service function (SF); a first selection module configured to select a corresponding instance node according to a mapping relationship between the computing-power service and a plurality of instance nodes under a condition that the computing-power service belongs to the SRv6 node; a first forwarding module, configured to forward the computing-power application traffic to the selected instance node.

According to another embodiment of the present disclosure, provided is a device for relaying computing-power application traffic, comprising: a second parsing module, configured to parse a computing-power service from a segment routing header (SRH) of the computing-power application traffic when the computing-power application traffic reaches an SRv6 node, wherein the computing-power service is encapsulated in the SRH as a hop in an SRv6 segment list; a second selection module configured to select, when the next hop indicated by the SRH is a computing-power service, a corresponding instance node according to a mapping relationship between the computing-power service and a plurality of instance nodes; a second forwarding module, configured to forward the computing-power application traffic to the selected instance node.

According to another embodiment of the present disclosure, a computer readable storage medium is also provided. The computer readable storage medium stores a computer program, wherein the computer program is configured to execute the steps in any one of the method embodiments when running.

According to another embodiment of the present disclosure, also provided is an electronic device, comprising a memory and a processor, wherein the memory stores a computer program, and the processor is configured to run the computer program so as to execute the steps in any one of the method embodiments.

DETAILED DESCRIPTION OF THE EMBODIMENTS

Embodiments of the present disclosure will be described below in detail with reference to the accompanying drawings and in conjunction with embodiments.

It should be noted that terms such as "first" and "second" in the description, claims and drawings of the present disclosure are set to distinguish similar objects, and are not necessarily set to describe a specific sequence or order.

Embodiment 1

Figure 1:
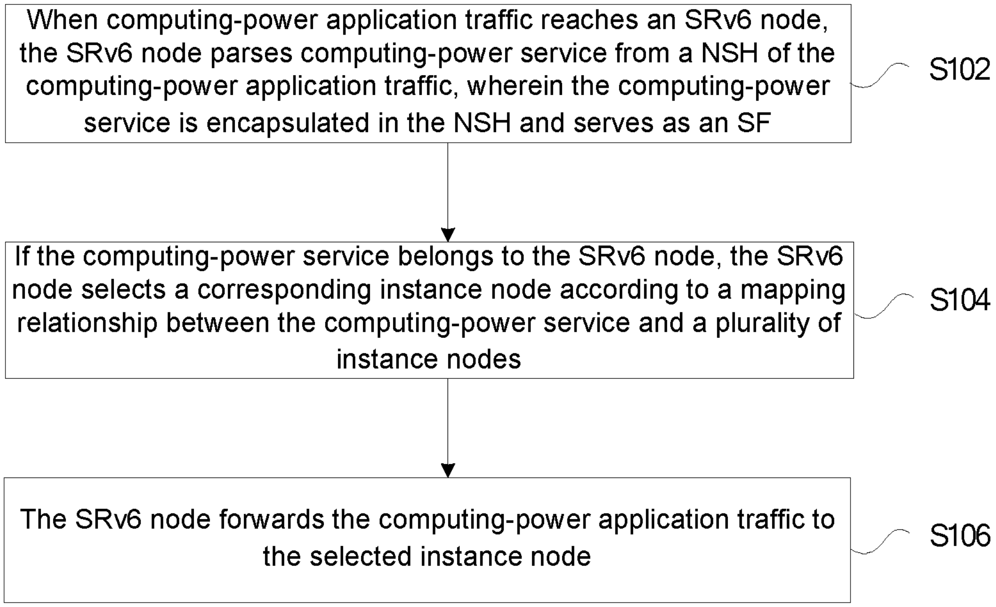
FIG. 1 is a flowchart of a method for forwarding computing-power application traffic according to an embodiment of the present disclosure.

Provided is a method for forwarding computing-power application traffic in the present embodiment. FIG. 1 is a flowchart of a method for forwarding computing-power application traffic according to an embodiment of the present disclosure. As shown in FIG. 1, the flow includes the following steps:

Step S102, when a computing-power application traffic reaches an SRv6 node, the SRv6 node parsing a computing-power service from a network service header (NSH) of the computing-power application traffic, wherein the computing-power service is encapsulated in the NSH as a service function (SF);

Step S104, if the computing-power service belongs to the SRv6 node, the SRv6 node selects a corresponding instance node according to a mapping relationship between the computing-power service and a plurality of instance nodes;

Step S106, the SRv6 node forwards the computing-power application traffic to the selected instance node.

In step S104 of this embodiment, if the current computing-power service belongs to other SRv6 nodes, the SRv6 node routes the computing-power application traffic to the next hop according to the transmission tunnel path information in the segment routing header SRH.

Before step S102 of this embodiment, the method can further include: the SRv6 routing node performing a computing-power service registration for a local computing-power service node, and creating a mapping relationship between the computing-power service and a plurality of instance nodes.

In this embodiment, the SRv6 node receives a computing-power service registration request of a local computing-power service node and resource state information of the instance nodes; the SRv6 node notifies locally registered power resource state information to a neighbor node via an IGP & BGP (Interior Gateway Protocol & Border Gateway Protocol) protocol, and creates a global power resource state database; or report computing-power resource state database to a centralized controller through a northbound interface, so that the centralized controller creates the global computing-power resource state database; the SRv6 node establishes a mapping relationship between the computing-power service and a plurality of instance nodes.

In this embodiment, the SRv6 node selects and selects a corresponding instance node from the plurality of instance nodes according to at least one of the following local configuration policies: shortest path, load balancing, and path delay.

In the above embodiments of the present disclosure, scheduling of the computing-power service is implemented based on the SRv6 forwarding mechanism, the computing-power function Segment identification in the SSH or the IPv6 source routing extension header SRH is abstracted, and a mapping relation is established with multiple instances thereof, so as to support dynamic multiple instances of the computing-power atom function.

Embodiment 2

Figure 2:
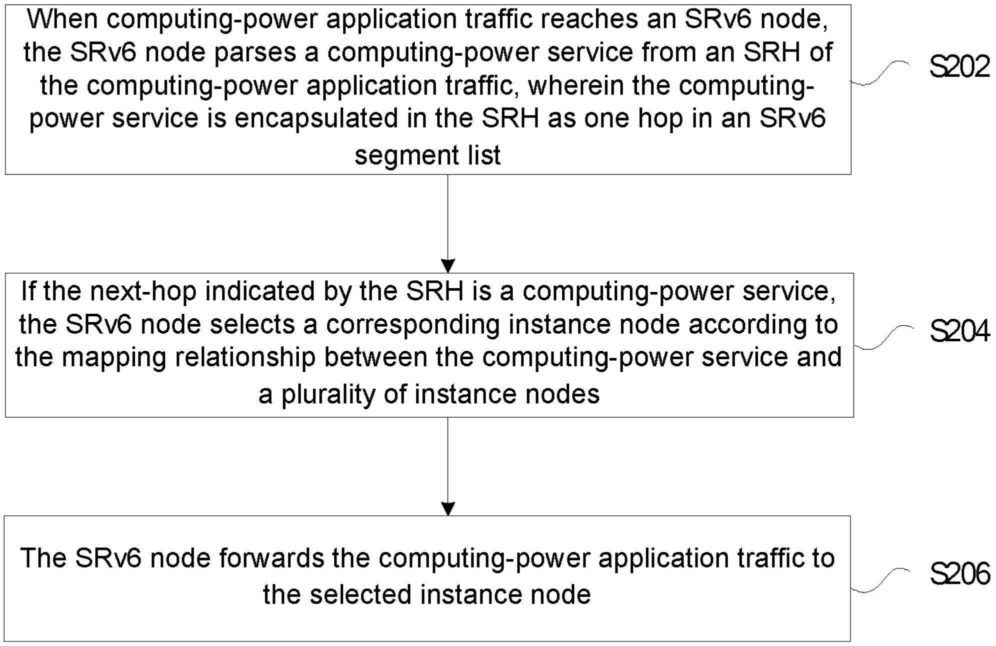
FIG. 2 is a flowchart of a method of computing-power application traffic forwarding according to another embodiment of the present disclosure.

In this embodiment, another method for forwarding computing-power application traffic is provided. FIG. 2 is a flowchart of a method for forwarding computing-power application traffic according to an embodiment of the present disclosure. As shown in FIG. 2, the method includes the following steps:

Step S202, when the computing-power application traffic reaches an SRv6 node, the SRv6 node parses a computing-power service from a segment routing header (SRH) of the computing-power application traffic, wherein the computing-power service is encapsulated in the SRH as a hop in an SRv6 segment list;

Step S204, if the next hop indicated by the SRH is a computing-power service, the SRv6 node selects a corresponding instance node according to a mapping between the computing-power service and a plurality of instance nodes;

Step S206, the SRv6 node forwards the computing-power application traffic to the selected instance node.

In step S204 of this embodiment, the method can further include: if the next hop indicated by the SRH is another SRv6 node, the SRv6 node routes the computing-power application traffic to the next hop.

Before step S202 of this embodiment, the method can further include: the SRv6 routing node performing a computing-power service registration for a local computing-power service node, and creating a mapping relationship between the computing-power service and a plurality of instance nodes.

In this embodiment, the SRv6 node receives a computing-power service registration request of a local computing-power service node and resource state information of the instance nodes; the SRv6 node notifies locally registered power resource state information to a neighbor node via an IGP & BGP (Interior Gateway Protocol & Border Gateway Protocol) protocol, and creates a global power resource state database; or report computing-power resource state database to a centralized controller through a northbound interface, so that the centralized controller creates the global computing-power resource state database; the SRv6 node establishes a mapping relationship between the computing-power service and a plurality of instance nodes.

In this embodiment, the SRv6 node may select and select a corresponding instance node from the plurality of instance nodes according to at least one of the following local configuration policies: shortest path, load balancing, and path delay.

In this embodiment, the mapping relationship between the computing-power service and the plurality of instance nodes includes one of the following modes: defining an Anycast segment routing (SR) identifier, wherein the anycast address identifies the computing-power service, and a plurality of member addresses associated with the computing-power service identify the plurality of instance nodes of the computing-power service; defining a computing-power service segment identification (CID), wherein the CID is associated with a dynamic instance node member group, and each instance node corresponds to a unique reachable address.

In this embodiment, if the instance node does not support SRv6 forwarding, the SRv6 proxy between the instance node and the SRv6 node is used to perform SRH encapsulation and decapsulation on the computing-power application traffic, and the instance node is proxied to complete the forwarding of the computing-power application traffic.

In this embodiment, when the computing-power application traffic reaches the SRv6 ingress node, the SRv6 ingress node performs source routing orchestration of the computing-power service traffic according to the global computing-power resource state database and the relationship between the computing-power service and each atomic computing-power service, and performs function programming of the atomic computing-power service.

In this embodiment, the atomic force computing-power service function may be marked by using a combination of Locator+Function+Argument, where Locator is a public address prefix of a force computing-power service instance node, Function is an atomic force computing-power service function identifier, and Argument is an optional parameter of Function.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

A device for forwarding computing-power application traffic is also provided in the present embodiment. The device is configured to implement the described embodiments and preferred implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Embodiment 3

Figure 3:
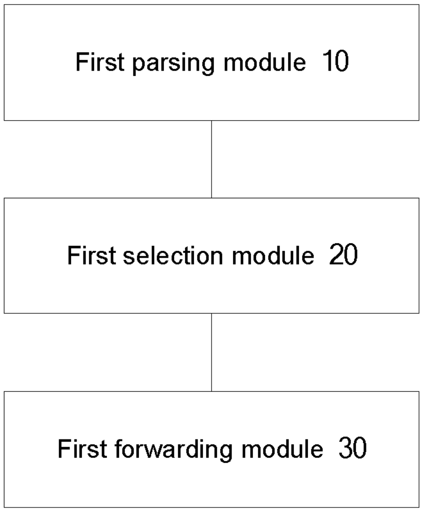
FIG. 3 is a structural block diagram of a device for computing-power application traffic forwarding according to an embodiment of the present disclosure.

FIG. 3 is a structural block diagram of a device for computing-power application traffic forwarding according to an embodiment of the present disclosure. As shown in FIG. 3, the device for computing-power application traffic forwarding includes a first parsing module 10, a first selecting module 20 and a first forwarding module 30.

The first parsing module 10 is configured to, when a computing-power application traffic reaches an SRv6 node, parse a computing-power service from a network service header (NSH) of the computing-power application traffic, wherein the computing-power service is encapsulated in the NSH as a service function (SF).

A first selection module 20, configured to select a corresponding instance node according to a mapping relationship between the computing-power service and a plurality of instance nodes under a condition that the computing-power service belongs to the SRv6 node.

A first forwarding module 30, configured to forward the computing-power application traffic to the selected instance node.

Embodiment 4

Figure 4:
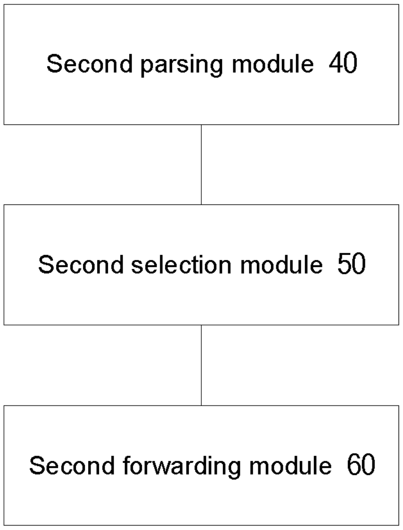
FIG. 4 is a structural block diagram of a device for computing-power application traffic forwarding according to another embodiment of the present disclosure.

FIG. 4 is a structural block diagram of a device for computing-power application traffic forwarding according to another embodiment of the present disclosure. As shown in FIG. 4, the device for computing-power application traffic forwarding includes a second parsing module 40, a second selecting module 50 and a second forwarding module 60.

A second parsing module 40, configured to parse a computing-power service from a segment routing header SRH of the computing-power application traffic when the computing-power application traffic reaches an SRv6 node, wherein the computing-power service is encapsulated in the SRH as one hop in an SRv6 segment list.

A second selection module 50, configured to, when the next hop indicated by the SRH is a computing-power service, select, by the SRv6 node, a corresponding instance node according to a mapping between the computing-power service and a plurality of instance nodes.

A second forwarding module 60, configured to forward the computing-power application traffic to the selected instance node.

It should be noted that each module may be implemented by software or hardware. The latter may be implemented in the following manner, but is not limited thereto. All the modules are located in a same processor; alternatively, the modules are located in different processors in an arbitrary combination.

To facilitate understanding of the technical solutions provided in the present disclosure, the following describes the technical solutions in detail with reference to embodiments of specific scenarios.

An embodiment of the present disclosure proposes an Computing-power network Orchestration and Forwarding mechanism based on an SRv6. The SRv6 orchestrates service identifiers by encapsulating the service identifiers in an IPv6 extension header SRH (Segment Routing Header) according to a processing sequence of a Service. A node where the service identifier is located is usually different from a network routing and forwarding device node. Therefore, the SRv6 is divided into two cases where a service node supports the SRv6 and does not support the SRv6. In the latter case, an SRv6 proxy needs to be set between an SRv6 network device and a service node. The SRv6 network domain forwards the traffic to the corresponding serving nodes in turn according to the encapsulation list of the serving nodes in the SRH for processing. Such a service chain processing mechanism can also implement a Service Function Chain (SFC) on an SRv6 network, i.e. a service plane NSH (Network Service Header) of the SFC is reserved; an SFF (Service Function Forwarder) function is implemented by a SRv6 network routing and forwarding node; an SRH only encapsulates an SFF node list; in this mechanism, an SRv6 forwarding plane is responsible for routing orchestration and forwarding of an SFF, and an NSH is responsible for traffic forwarding of a service function chain.

In a computing-power network scenario, the service instance is a computing-power service instance, but the computing-power service herein is a virtualized instance in many scenarios and can migrate dynamically, and the instances of the same computing-power service are not unique. In the current SRv6 mechanism, a service instance is tightly coupled to addresses of networks L2 and L3, and corresponds to a computing-power service dynamic multi-instance scenario of a computing-power network, and an extended mechanism of the SRv6 needs to be designed to support address decoupling between the service instance and the networks L2 and L3.

An upper-layer computing-power application is decomposed into several basic computing-power services. The latter are distributed in a network in the form of computing-power service instances, and may be distributed in a cloud or distributed between clouds. The network routes and directs service traffic according to computing-power service features, so that the application traffic sequentially obtains corresponding basic computing-power services. The basic computing-power services are organized and encapsulated in an SRH in the form of Segment identifications. The above SFC NSH encapsulation mode based on SRv6 is similar to this in terms of implementation mechanism. The difference is that a basic computing-power service is encapsulated in the NSH as an SF, and the NSH implements routing and forwarding of service traffic.

1) SRv6-Based NSH Computing-Power Network Forwarding Solution

As a service function (SF) in a service function chain, a computing-power service is arranged by an NSH and jointly routes a computing-power service flow with an SRv6 routing and forwarding node, and the SRv6 realizes the arrangement and routing of a computing-power service flow transmission tunnel, i.e. a computing-power service flow transmission tunnel path is realized by an SRH.

Specifically, as described above, in actual deployment, a same computing-power service (or function) is dynamic and multi-instance, i.e., is no longer hard bound to a specific single L2 and L3 layer address, but is associated with a plurality of computing-power service instance nodes, i.e., a plurality of addresses. Therefore, in addition to supporting the SFF function, the SRv6 forwarding and routing nodes herein also need to establish a mapping table of 1:N (N greater than or equal to 1) for each computing-power service (or function) that can be served by the network, and select one node from a plurality of instance nodes of the computing-power service to forward the service traffic according to the local configuration policies (shortest path, load balance, path delay, etc.) while determining the current computing-power service (or function) by resolving SPI & SI in the NSH. In this way, service traffic routing in a distributed computing function scenario is implemented.

An SRv6 forwarding and routing node needs to create a distributed computing-power service (or function) and an instance node resource state library thereof in the entire network. A computing-power service instance node to which the SRv6 local belongs registers computing-power service resource state information of the instance nodes to the SRv6 forwarding and routing node by means of an application message. The computing-power service resource state information between the SRv6 network nodes can be synchronized and notified with each other by means of a distributed routing protocol IGP (Interior Gateway Protocol) and BGP (Border Gateway Protocol) or a control plane protocol in the DC, and can also be uniformly reported to a centralized controller or an orchestrator by means of a northbound interface, and the latter performs orchestration and distribution of forwarding and routing policies.

2) SRv6-Based Computing-Power Network Forwarding Solution

A distributed computing-power service (or function) is arranged into a segment list as an SRv6 segment. The same type of computing-power service is executed only once in a specific index of the Segment list, but there may be a plurality of distributed instance nodes thereof, and the resource states and availability states thereof are all dynamic; therefore, a traditional SRv6 Segment identification is not suitable for this scenario. The present disclosure designs two technical solutions to solve this problem:

An SRv6-based computing-power service identifier scheme.

The computing-power service is defined as an SRv6 segment identification, and is encapsulated in the SRH, and used as a one-hop service function in the traffic routing. The segment identification semantically indicates only an abstract computing-power service, which is a one-to-many mapping relationship with its specific instance nodes.

Specifically, a mapping relationship that a computing-power service (or function) corresponds to a plurality of instances may be implemented in the following two modes:

(1) Defining a computing-power service as a segment identification with an anycast type, i.e. an anycast segment identification, wherein an anycast address identifies the computing-power service, and a plurality of member addresses associated therewith identify the instances of the computing-power service;

(2) Defining computing-power service segment identification, i.e., Computing Segment identification (referred to as CID). CID is associated with a dynamic instance member group, and each instance corresponds to a unique reachable address. Different member instances may be in the same DC, and may also be distributed in different DCs. The pervious hop of CID selects a specific member instance to forward the service traffic according to the network resource state and the network SLA of the service.

An SRv6-based computing-power programming scheme. Programming an atomic computing-power service function in an SRv6 segment identification, i.e. dividing the SRv6 segment into two parts: a Locator and a Function, in which the Locator identifies an IPv6 address prefix of a computing-power service instance node, and the Function identifies an atomic computing-power service function and an optional function parameter, such as a row and a column of matrix operations; and the two together uniquely identify an atomic calculation function and an instance address that can be reached globally. The mapping relationship between the same computing-power service (or function) and different computing instance nodes thereof is maintained by an SRv6 forwarding and routing node, and the first node in SRv6 domain performs actual forwarding tunnel orchestration of service traffic according to state information about each instance node, i.e. selects an optimal computing-power service instance node as a processing node of the SRv6, performs computing-power service programming according to an appropriate forwarding and processing time sequence in the manner of the described Locator+Function, and encapsulates the SRH.

Embodiment 5

This embodiment provides an SRv6-based traffic forwarding and processing method applied to an NSH computing-power network. In this embodiment, the SRv6 is used as a network transmission tunnel solution for computing-power service traffic, that is, the SRH only encapsulates a network path of the traffic, and the computing-power service is implemented by the NSH, that is, a computing-power service layer function is implemented. An SRv6 network routing and forwarding node simultaneously serves as an SFF forwarding and routing node function, i.e. having the capability of parsing, encapsulating and forwarding of an NSH; in addition, a mapping relationship between an computing-power service and a plurality of instance nodes thereof needs to be maintained by the node, and a specific member instance node is selected according to a local policies to forward an computing-power application traffic.

Figure 5:
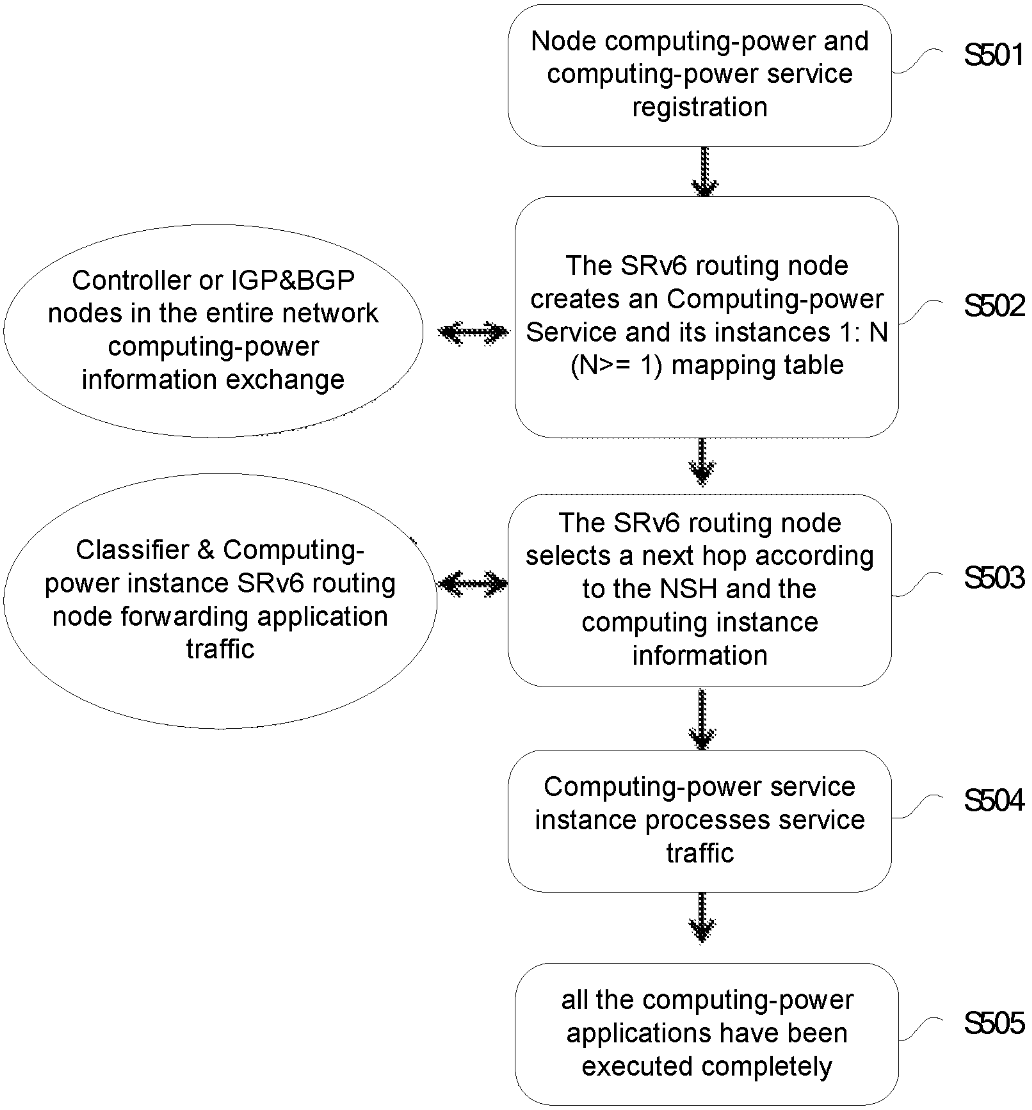
FIG. 5 is a flowchart of a network application traffic forwarding process based on SRv6 according to an embodiment of the present disclosure.

FIG. 5 is a flowchart of a forwarding and processing method for an NSH computing-power network application based on SRv6. As shown in FIG. 5, the method includes the following steps:

Step S501, an computing-power node registers an computing-power service and instance resource state information thereof to an SRv6 node, and the SRv6 node notifies neighbor nodes of locally registered computing-power resource state information by means of an IGP & BGP protocol, thereby creating a global computing-power resource state database. May also report the computing-power resource state information to the centralized controller in a unified manner via a northbound interface, and the latter creates a global computing-power resource state database;

Step S502, the SRv6 node establishes a mapping relationship table for the computing-power service and multiple instances thereof, including but not limited to an anycast address mode;

Step S503, when a computing-power application traffic reaches an SRv6 node, and the SRv6 node parses an NSH and identifies a current computing-power service; according to a mapping relationship between the computing-power service and multiple instances, a suitable instance node is selected according to a local policies, and the computing-power application traffic is forwarded;

Step S504, if the next computing-power service indicated by the NSH belongs to a local node, repeating step S503; if the next computing-power service indicated by the NSH belongs to other SRv6 nodes, the current SRv6 node routes the computing-power application traffic to the next hop according to the SRH, the next hop SRv6 parses the NSH, step S503 is repeated, and forwarding and processing is locally performed on the computing-power application traffic; the last NSH identified computing-power service is executed, and the SRH is executed to the last hop;

Step S505, the execution of the entire computing-power application service is completed.

Embodiment 6

This embodiment provides a method for implementing traffic forwarding of a computing-power network based on SRv6 computing-power programming. In this embodiment, the computing-power service (function) is encapsulated in the SRH as a hop in the SRv6 Segment list, and routes and forwards the computing-power application traffic according to the SRv6 mechanism. A segment identification is allocated to a computing-power service, and a mapping table is established for the computing-power service identifier and multiple instances of the computing-power service identifier at an SRv6 routing node. As described above, such a one-to-multiple computing-power service and instance mapping relationship may be implemented in two modes including, but not limited to, the following:

Manner 1: a computing-power service is defined as a segment identification with an anycast type, i.e., an anycast segment identification, wherein an anycast address identifies the computing-power service, and a plurality of member addresses associated therewith identify the instances of the computing-power service;

Manner 2: a computing-power service segment identification, i.e., a Computing Segment identification (referred to as CID) is defined. CID is associated with a dynamic instance member group, and each instance corresponds to a unique reachable address. Different member instances may be in the same DC, and may also be distributed in different DCs. The previous hop of CID selects a specific member instance to forward the service traffic according to the network resource state and the network SLA of the service.

Specially, in this embodiment, if the computing-power service instance node does not support the SRv6 forwarding, the SRv6 proxy between the instance node and the SRv6 routing node needs to be used to perform the SRH encapsulation and decapsulation on the service traffic of the round-trip computing-power service instance node, and the computing-power service instance node is proxied to complete the SRv6 forwarding.

Figure 6:
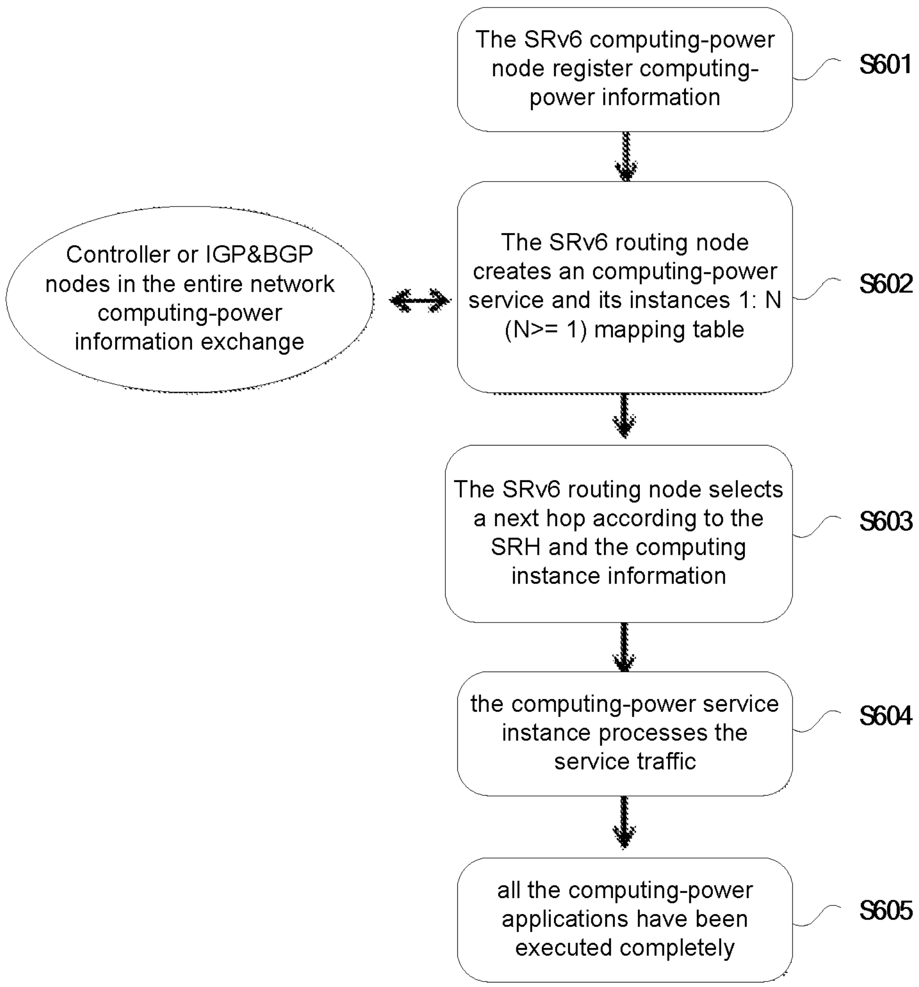
FIG. 6 is a flowchart of a process of calculating network application traffic forwarding based on SRv6 computing-power programming according to an embodiment of the present disclosure.

FIG. 6 is a schematic flowchart of a method for forwarding traffic of a computing-power network application based on an SRv6 computing-power service identifier. As shown in FIG. 6, the method may include the following steps:

Step S601, an SRv6 node registers a computing-power service and instance resource state information thereof to an SRv6 routing node, and the SRv6 routing node notifies neighbour nodes of locally registered computing-power resource state information by means of an IGP & BGP protocol, thereby creating a global computing-power resource state database. The SRv6 node may also reports the computing-power resource state information to the centralized controller in a unified manner via a northbound interface, and the latter creates a global computing-power resource state database;

Step S602, the SRv6 routing node establishes a table of a mapping relationship between computing-power service and a plurality of instances thereof;

Step S603, when the computing-power application traffic reaches an SRv6 routing node, and if a next hop indicated by an SRH is a computing-power service, an appropriate instance node is selected according to a local policies according to a mapping relationship between the computing-power service and multiple instances thereof, and the calculation application traffic is forwarded; if the next hop indicated by the SRH is an SRv6 routing node, the computing-power application traffic is directly routed to the next hop;

Step S604, if the next computing-power service indicated by the SRH belongs to the local node, step S603 is repeated; if the next computing-power service indicated by the SRH is not in local, the current SRv6 routing node routes the computing-power application traffic to the next hop, the next hop SRv6 parses the SRH, step S603 is repeated, and locally forwarding and processing is performed on the computing-power application traffic; SRH is executed to the last hop;

Step S605, the execution of the entire computing-power application service is completed.

Embodiment 7

This embodiment provides a method for forwarding traffic of a computing-power network application based on an SRv6 computing-power service identifier. In this embodiment, the computing-power service (function) is encapsulated in the SRH as a hop in the SRv6 Segment list, and the computing-power application traffic is routed and forwarded according to the SRv6 mechanism. a computing-power service segment identification is allocated to a computing-power service (function), and an atomic computing-power service function programming is performed on the segment identification, i.e. a computing-power service identification is identified by means of a combination of Locator+Function+Argument, wherein Locator is an IPv6 address prefix of a computing-power service node, Function is an atomic computing-power service function identifier, and Argument is an optional parameter of Function. A locator is a public address prefix of a corresponding computing-power service instance node; an SRv6 routing node maintains a mapping table between a computing-power service and multiple instances thereof; and at an SRv6 ingress node, a specific computing-power service instance is selected for routing of a computing-power service source according to a computing-power database.

Specially, in this embodiment, if the computing-power service instance node does not support the SRv6 forwarding, the SRv6 proxy between the instance node and the SRv6 routing node needs to be used to perform the SRH encapsulation and decapsulation on the service traffic of the round-trip computing-power service instance node, and the computing-power service instance node is proxied to complete the SRv6 forwarding.

Figure 7:
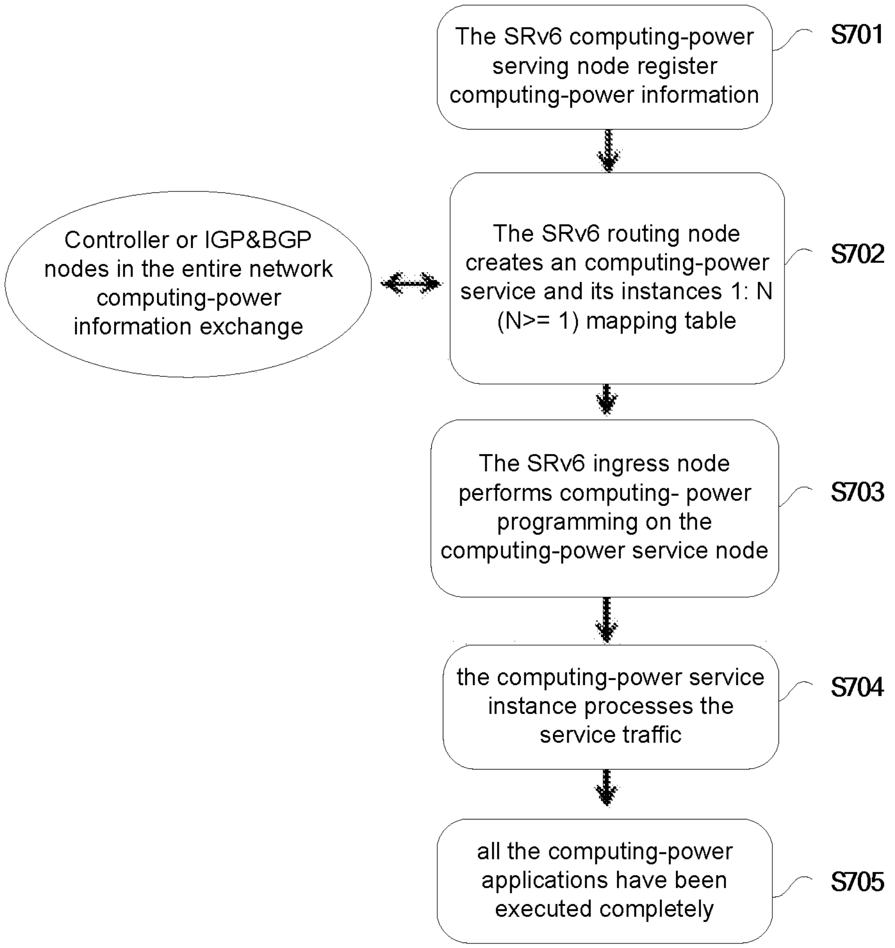
FIG. 7 is a flowchart of a process of forwarding traffic of a computing-power network application based on an SRv6 computing-power service identification according to an embodiment of the present disclosure.

FIG. 7 is a flowchart of a method for forwarding traffic of a computing-power network application based on an SRv6 computing-power service identifier, and as shown in FIG. 7, the method includes the following steps:

Step S701, an SRv6 node registers a computing-power service and instance resource state information thereof to an SRv6 routing node, and the SRv6 routing node notifies neighbor nodes of locally registered computing-power resource state information by means of an IGP & BGP protocol, thereby creating a global computing-power resource state database. The SRv6 node may also report the computing-power resource state information to the centralized controller in a unified manner via a northbound interface, and the centralized controller creates a global computing-power resource state database;

Step S702, the SRv6 routing node establishes a table of mapping relationship between a computing-power service and a plurality of instances thereof;

Step S703, when the computing-power application traffic reaches the SRv6 ingress node, and the node selects an instance node of each computing-power service according to a global computing-power resource state database, and performs the described computing-power service instance node identification programming. If the next hop indicated by the SRH is a computing-power service, according to a mapping relationship between the computing-power service and multiple instances thereof, selecting a suitable instance node according to a local policies, and forwarding computing-power application traffic; if the next hop indicated by the SRH is an SRv6 routing node, the computing-power application traffic is directly routed to the next hop;

Step S704, if the next computing-power service indicated by the SRH belongs to the local node, then step S703 is repeated; if the next computing-power service indicated by the SRH is not in local, the current SRv6 routing node routes the computing-power application traffic to the next hop, the next hop SRv6 parses the SRH, step S703 is repeated, and forwarding and processing is performed on the computing-power application traffic locally; the SRH is executed to the last hop;

Step S705, the execution of the entire computing-power application service is completed.

Embodiments of the present disclosure also provide a computer readable storage medium. The computer readable storage medium stores a computer program, wherein the computer program is configured to, when the computer program is running in a processor, execute the steps in any one of the described method embodiments.

In an exemplary embodiment, the computer readable storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, comprising a memory and a processor. The memory stores a computer program. The processor is configured to run the computer program to execute steps in any one of the method embodiments.

In an exemplary embodiment, the electronic apparatus can further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those skilled in the art should understand that each module or each step of the present disclosure may be implemented by a universal computing device, and the modules or steps may be concentrated on a single computing device or distributed on a network formed by a plurality of computing devices, and may be implemented by program codes executable for the computing devices, so that the modules or steps may be stored in a storage device for execution with the computing devices, the shown or described steps may be executed in sequences different from those described here in some cases, or may form each integrated circuit module respectively, or multiple modules or steps therein may form a single integrated circuit module for implementation. As such, the present disclosure is not limited to any particular hardware and software combination.

The above descriptions are only preferred embodiments of the present disclosure, and are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A method for forwarding computing-power application traffic, comprising:

when computing-power application traffic reaches a Segment Routing over IPv6 (SRv6) node, parsing, by the SRv6 node, a computing-power service from a network service header (NSH) of the computing-power application traffic, wherein the computing-power service is encapsulated in the NSH as a service function (SF);

when the computing-power service belongs to the SRv6 node, selecting, by the SRv6 node, a corresponding instance node according to a mapping relationship between the computing-power service and a plurality of instance nodes;

forwarding, by the SRv6 node, the computing-power application traffic to the selected instance node;

wherein when the computing-power application traffic reaches the SRv6 node, before the SRv6 node parses the computing-power service from the NSH of the computing-power application traffic, the method further comprises:

performing, by the SRv6 node, a computing-power service registration for a local computing-power service node, and establishing a mapping relationship between the computing-power service and a plurality of instance nodes.

2. The method according to claim 1, wherein after the SRv6 node parses the computing-power service from the NSH of the computing-power application traffic, the method further comprises:

when the computing-power service belongs to other SRv6 nodes, routing, by the SRv6 node, the computing-power application traffic to the next hop according to transmission tunnel path information in a Segment Route Header (SRH).

3. The method according to claim 1, wherein the SRv6 routing node performs a computing-power service registration for a local computing-power service node, and establish a mapping relationship between the computing-power service and a plurality of instance nodes, comprising:

receiving, by the SRv6 node, a computing-power service registration request of a local computing-power service node and resource state information of the instance nodes;

notifying, by the SRv6 node, locally registered power resource state information to a neighbor node, and creating a global computing-power resource state database; or reporting computing-power resource state database to a centralized controller through a northbound interface, so that the centralized controller creates the global computing-power resource state database;

establishing, by the SRv6 node, a mapping relationship between the computing-power service and the plurality of instance nodes.

4. The method according to claim 1, wherein the selecting, by the SRv6 node, a corresponding instance node according to a mapping relationship between the computing-power service and the plurality of instances comprises:

selecting, by the SRv6 node, a corresponding instance node from the plurality of instance nodes according to at least one of the following local configuration policies: shortest path, load balancing, and path delay.

5. A non-transitory computer readable storage medium, wherein the computer readable storage medium stores a computer program, and the computer program is configured to, when executed by a processor, cause the processor implement the steps of the method as claimed in claim 1.

6. An electronic apparatus, comprising a memory, a processor, and a computer program stored on the memory, wherein the processor is configured to run the computer program to implement the steps of the method as claimed in claim 1.

7. An electronic apparatus, comprising a memory, a processor, and a computer program stored on the memory, wherein the processor is configured to run the computer program to implement the steps of the method as claimed in claim 2.

8. A method for forwarding computing-power application traffic, comprising:

when computing-power application traffic reaches a Segment Routing over IPv6 (SRv6) node, the parsing, by the SRv6 node, a computing-power service from a segment routing header (SRH) of the computing-power application traffic, wherein the computing-power service is encapsulated in the SRH as one hop in an SRv6 segment list;

when the next hop indicated by the SRH is a computing-power service, selecting, by the SRv6 node, a corresponding instance node according to a mapping relationship between the computing-power service and a plurality of instance nodes;

forwarding, by the SRv6 node, the computing-power application traffic to the selected instance node;

wherein when the computing-power application traffic reaches the SRv6 node, before the SRv6 node parses the computing-power service from the SRH of the computing-power application traffic, the method further comprises:

performing, by the SRv6 node, a computing-power service registration for a local computing-power service node, and establishing a mapping relationship between the computing-power service and a plurality of instance nodes.

9. The method according to claim 8, wherein after the SRv6 node obtains the computing-power service by means of parsing from the SRH of the computing-power application traffic, the method further comprises:

when the next hop indicated by the SRH is another SRv6 node, routing, by the SRv6 node, the computing-power application traffic to the next hop.

10. The method according to claim 8, wherein the SRv6 routing node performs a computing-power service registration for a local computing-power service node, and establishes a mapping relationship between the computing-power service and a plurality of instance nodes, comprising:

receiving, by the SRv6 node, a computing-power service registration request of the local computing-power service node and resource state information of the instance nodes;

notifying, by the SRv6 node, the locally registered power resource state information to a neighbor node, and creating a global computing-power resource state database; or reporting computing-power resource state database to a centralized controller through a northbound interface, so that the centralized controller creates the global computing-power resource state database;

establishing, by the SRv6 node, a mapping relationship between the computing-power service and a plurality of instance nodes.

11. The method according to claim 8, wherein the selecting, by the SRv6 node, a corresponding instance node according to a mapping relationship between the computing-power service and a plurality of instances comprises:

selecting, by the SRv6 node, a corresponding instance node from the plurality of instance nodes according to at least one of the following local configuration policies: shortest path, load balancing, and path delay.

12. The method according to claim 8, wherein the mapping relation between the computing-power service and the plurality of instance nodes comprises one of the following modes:

defining an SRv6 identifier with anycast type, wherein an anycast address identifies the computing-power service, and a plurality of member addresses associated with the computing-power service identify the plurality of instance nodes of the computing-power service;

defining a computing-power service SRv6 identifier (CID), wherein the CID is associated with a dynamic instance node member group, and each instance node corresponds to a unique reachable address.

13. The method according to claim 8, further comprising:

when the instance node does not support SRv6 forwarding, performing, by an SRv6 proxy between the instance node and the SRv6 node, an SRH encapsulation and decapsulation on the computing-power application traffic, and the instance node is proxied to complete the forwarding of the computing-power application traffic.

14. The method according to claim 8, wherein before the computing-power application traffic reaches the SRv6 node, the method further comprises:

when the computing-power application traffic reaches an SRv6 ingress node, selecting, by the SRv6 ingress node, an instance node of each computing-power service according to the global computing-power resource state database, and performing an atomic computing-power service function programming.

15. The method according to claim 14, wherein performing the atomic force service function programming comprises:

identifying an atomic computing-power service function by means of a combination of a Locator+Function+Argument, wherein the locator is a public address prefix of a computing-power service instance node, the Function is an atomic computing-power service function identifier, and the Argument is an optional parameter of the Function.

16. An electronic apparatus, comprising a memory, a processor, and a computer program stored on the memory, wherein the processor is configured to run the computer program to implement the steps of the method as claimed in claim 6.

17. A non-transitory computer readable storage medium, wherein the computer readable storage medium stores a computer program, and the computer program is configured to, when executed by a processor, cause the processor implement the steps of the method as claimed in claim 6.

18. A device for forwarding computing-power application traffic, comprising:

a first parsing module, configured to parse a computing-power service from a network service header (NSH) of a computing-power application traffic when the computing-power application traffic reaches a Segment Routing over IPv6 (SRv6) node, wherein the computing-power service is encapsulated in the NSH as a service function (SF);

a first selection module, configured to select a corresponding instance node according to a mapping relationship between the computing-power service and a plurality of instance nodes under a condition that the computing-power service belongs to the SRv6 node;

a first forwarding module, configured to forward the computing-power application traffic to the selected instance node;

wherein when the computing-power application traffic reaches the SRv6 node, before the SRv6 node parses the computing-power service from the NSH of the computing-power application traffic, the first parsing module is further configured to:

perform a computing-power service registration for a local computing-power service node, and establish a mapping relationship between the computing-power service and a plurality of instance nodes.

* * * * *